(12) United States Patent
Miller et al.

(10) Patent No.: US 10,626,741 B2
(45) Date of Patent: Apr. 21, 2020

(54) SEAL HOUSING PRE-TAPER

(71) Applicant: United Technologies Corporation, Hartford, CT (US)

(72) Inventors: Jonathan L. Miller, Ware, MA (US); Nasr A. Shuaib, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 451 days.

(21) Appl. No.: 14/601,890

(22) Filed: Jan. 21, 2015

(65) Prior Publication Data

US 2016/0208921 A1 Jul. 21, 2016

(51) Int. Cl.
| F01D 11/00 | (2006.01) |
| F16J 15/16 | (2006.01) |
| F16J 15/44 | (2006.01) |

(52) U.S. Cl.
CPC ............ F01D 11/00 (2013.01); F01D 11/003 (2013.01); F16J 15/441 (2013.01); F16J 15/442 (2013.01); F05D 2250/292 (2013.01)

(58) Field of Classification Search
CPC ....... F16J 15/16; F01D 11/00; F05D 2300/30; F05D 2220/32; F05D 2240/55
See application file for complete search history.

(56) References Cited

U.S. PATENT DOCUMENTS

| 3,061,318 | A | * | 10/1962 | Laser ............... F16J 15/348 |
| | | | | 277/369 |
| 4,972,986 | A | | 11/1990 | Lipschitz |
| 5,014,999 | A | * | 5/1991 | Makhobey ........... F01D 11/003 |
| | | | | 277/422 |
| 5,129,156 | A | | 7/1992 | Walker |
| 5,169,159 | A | | 12/1992 | Pope |
| 5,301,957 | A | | 4/1994 | Hwang et al. |
| 5,954,477 | A | | 9/1999 | Balsdon |
| 7,779,807 | B2 | | 8/2010 | Tanaka |
| 8,821,113 | B2 | | 9/2014 | Richardson |
| 2008/0265513 | A1 | | 10/2008 | Justak |
| 2009/0101328 | A1 | * | 4/2009 | Leslie ............... E21B 17/003 |
| | | | | 166/65.1 |
| 2014/0035238 | A1 | | 2/2014 | Richie et al. |
| 2016/0153300 | A1 | | 6/2016 | Carrieres |

FOREIGN PATENT DOCUMENTS

| JP | S5817260 Y2 | 2/1983 |
| JP | H05106744 | 4/1993 |

OTHER PUBLICATIONS

John Wilson Payne, "Feasibility Study of a Controllable Mechanical Seal for Reactor Coolant Pumps", Thesis Presented to the Georgia Institute of Technology, May 2013.

(Continued)

Primary Examiner — Eugene G Byrd
Assistant Examiner — Thomas L Neubauer
(74) Attorney, Agent, or Firm — Getz Balich LLC

(57) ABSTRACT

Aspects of the disclosure are directed to an apparatus comprising a first section, and a second section coupled to the first section, wherein the second section is configured to substantially coincide with an edge of a seal and includes a pre-tapered edge.

13 Claims, 5 Drawing Sheets

(56) References Cited

OTHER PUBLICATIONS

Shashikants S. Goilkar, "Design and Development of a Test Setup for Online Wear Monitoring of Mechanical Face Seals using a Torque Sensor", Tribology Transactions, 52: 47-58, 2009, ISSN: 1040-2004 print / 1547-397X online, DOI: 10.1080110402000802163017, Powai, Mumbai-400076, India, downloaded Jun. 26, 2012.
NASA, "2000 NASA Seal/Secondary Air System Workshop", NASA/CP—2001-211208/vol. 1, Proceedings of a conference held at and sponsored by NASA Glenn Research Center, Cleveland, OH, Oct. 25-26, 2000, published Oct. 2001.
Parker.com, "PTFE Lip Seal Design Guide", Catalog EPS 5340/USA, 2008.
EP search report for EP16152306.3 dated Jul. 28, 2016.

\* cited by examiner

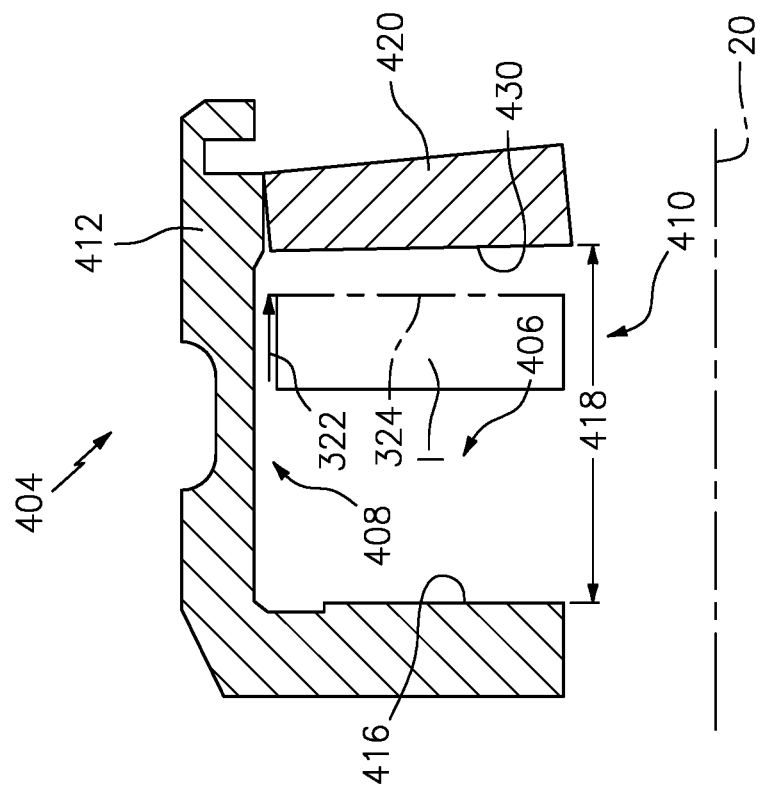
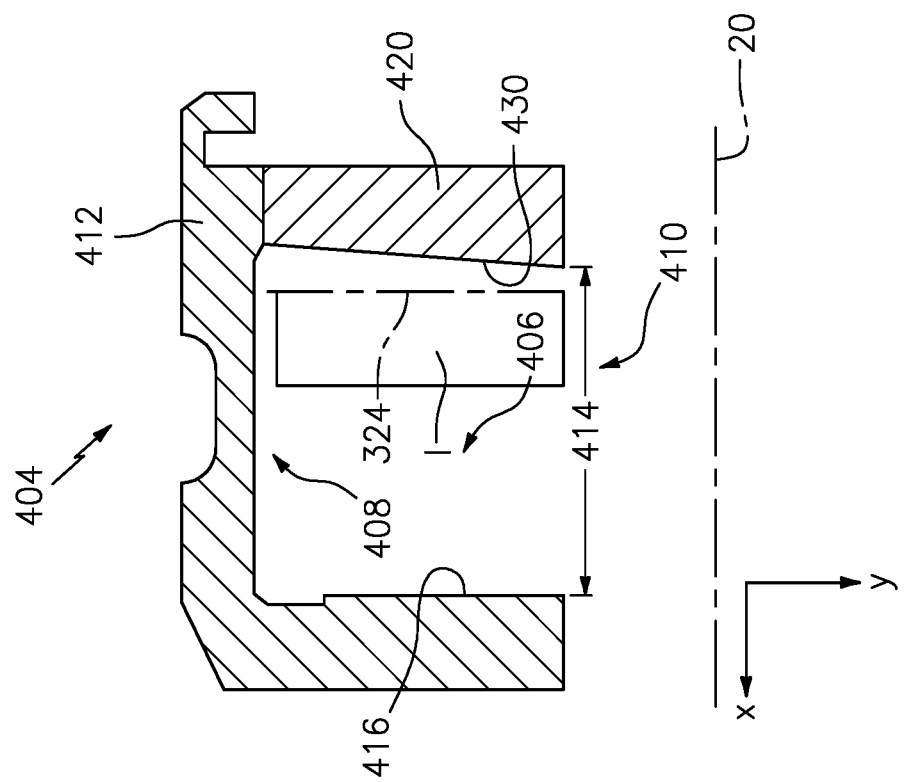
FIG. 4B
FIG. 4A

SEAL HOUSING PRE-TAPER

BACKGROUND

Advanced, high-performance engines will require main shaft bearing compartment seals with improved performance relative to conventional seals, while also being required to meet more aggressive cost, weight, size, and reliability metrics. Improved capability main shaft bearing compartment carbon seals are needed to meet the increased demands of next generation high-performance engines. Carbon seals enable an engine and bearing compartment to function with minimal impact on Thrust Specific Fuel Consumption (TSFC), a thermal management system (TMS), and a lubrication system.

Advanced aircraft engines require seals with improved wear resistance, improved performance, and improved reliability in order to meet customer, user, or program metrics. Conventional applications have experienced elevated wear and sealing dam breakage, which results in an increase in air leakage and oil loss characteristics. Excessive seal housing coning slope in the divergent direction, with respect to an air flow direction, contributes to additional axial contact pressure and carbon element wear. Excessive seal housing coning slope in the divergent direction increases the axial air load and resulting contact pressure. For applications that contain excessive levels of housing coning slope, elevated shaft speeds, air pressure differential, small contact area and existing high levels of contact pressure, existing environments would introduce significant risk for axial carbon wear issues and life concerns.

FIG. 1A illustrates a typical seal environment as would be known to one of skill in the art and includes one or more carbon rings 1 (arranged adjacent to one another in FIG. 1A), radial springs 2, axial springs 3, and/or seal housings 4 placed atop/proximate a seal runner 5. Referring to FIG. 1B, one of the carbon rings 1 is shown in an unworn condition. In contrast to FIG. 1B, due to axial carbon ring wear during operational use, a wear "step" 1' may be created as shown in FIG. 1C.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to an apparatus comprising: a first section, and a second section coupled to the first section, wherein the second section is configured to substantially coincide with an edge of a seal and includes a pre-tapered edge. In some embodiments, a magnitude of a pre-tapering associated with the pre-tapered edge is selected to be approximately equal to a magnitude of a coning that the second section experiences when the apparatus is placed into operational use. In some embodiments, a direction of a pre-tapering associated with the pre-tapered edge is selected to be approximately opposite to a direction of a coning that the second section experiences when the apparatus is placed into operational use. In some embodiments, a pre-tapering associated with the pre-tapered edge is approximately equal to 0.004 inches per inch. In some embodiments, the apparatus is configured to house two rings. In some embodiments, the pre-tapered edge is based on a specification of at least one of: a first material that is used for the first section, a second material that is used for the second section, a third material that is used for at least one ring, a first dimension of the first section, a second dimension of the second section, a third dimension of the at least one ring, an operational temperature, an operational pressure, an operational force, an interference fit magnitude, or a variation of a parameter within a housing structure.

Aspects of the disclosure are directed to a system configured for providing a seal for an aircraft engine, comprising: at least two rings arranged adjacent to one another, and a housing comprising a plurality of sections configured to house the at least two rings, wherein one of the sections is configured to substantially coincide with an edge of one of the at least two rings and includes a pre-tapered edge. In some embodiments, a magnitude of a pre-tapering associated with the pre-tapered edge is selected to be approximately equal to a magnitude of a coning that the one of the sections experiences when the system is placed into operational use. In some embodiments, a direction of a pre-tapering associated with the pre-tapered edge is selected to be approximately opposite to a direction of a coning that the one of the sections experiences when the system is placed into operational use. In some embodiments, a pre-tapering associated with the pre-tapered edge is selected to avoid generating a step in the at least two rings when the system is placed into operational use. In some embodiments, the at least two rings are carbon rings. In some embodiments, a pre-tapering associated with the pre-tapered edge is within a range of a first value that is greater than zero and a second value that is approximately equal to 0.050 inches per inch.

BRIEF DESCRIPTION OF THE DRAWINGS

The present disclosure is illustrated by way of example and not limited in the accompanying figures in which like reference numerals indicate similar elements.

FIG. 4A illustrates a seal housing in accordance with aspects of this disclosure.

FIG. 4B illustrates the seal housing of FIG. 4A when subjected to operational coning in accordance with aspects of this disclosure.

DETAILED DESCRIPTION

Figure 1A:
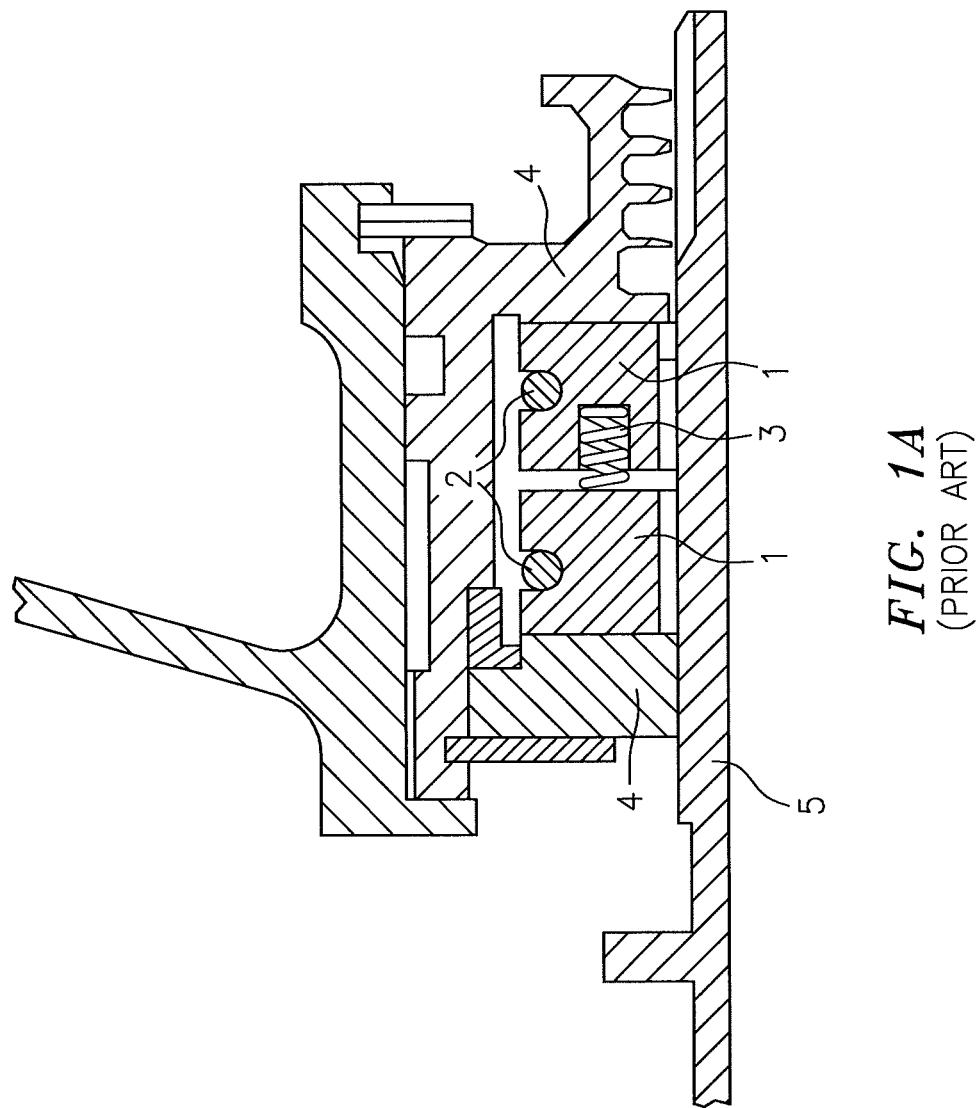
FIG. 1A illustrates a sealing environment in accordance with the prior art.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for providing countering the impact of seal housing coning slope during operation. In some embodiments, a seal housing may be subjected to a pre-taper machining to counter a predicted/predetermined coning slope.

Figure 2:
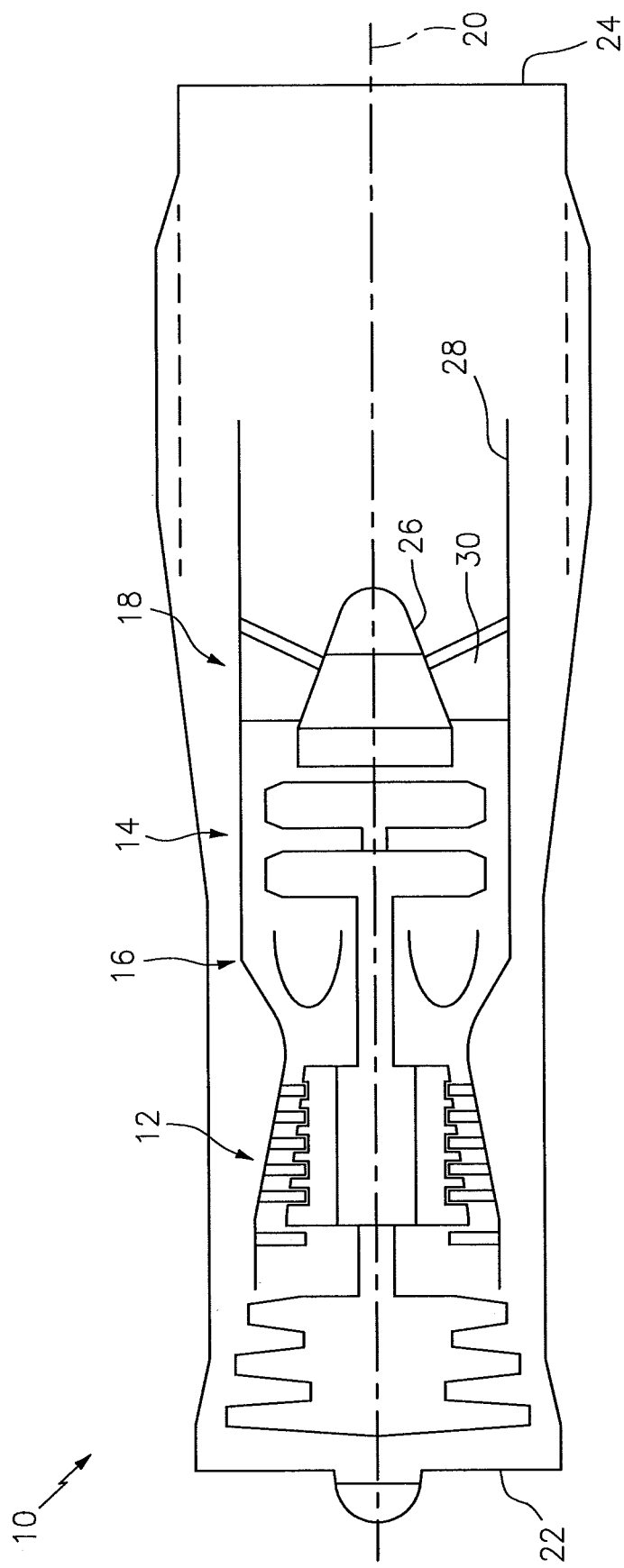
FIG. 2 illustrates an exemplary gas turbine engine in accordance with aspects of this disclosure.

Aspects of the disclosure may be applied in connection with an aircraft, or portion thereof. For example, aspects of the disclosure may be applied in connection with a gas turbine engine. FIG. 2 is a side-sectional illustration of an exemplary gas turbine engine 10. The engine 10 includes a compressor section 12, a turbine section 14 and one or more engine hot sections. The engine hot sections may include, for example, a first engine hot section 16 configured as a combustor section and a second engine hot section 18 configured as an augmentor section. The compressor section 12, the first engine hot section 16, the turbine section 14 and the second engine hot section 18 may be sequentially aligned along an axial centerline 20 between a forward engine airflow inlet 22 and an aft engine airflow exhaust 24.

The second engine hot section 18 includes a first (e.g., annular, radial inner) duct case 26, a second (e.g., annular, radial outer) duct case 28, and one or more hot section vanes 30.

The engine 10 is illustrative. Aspects of the disclosure may be applied in connection with other engine types or configurations.

Figure 1C:
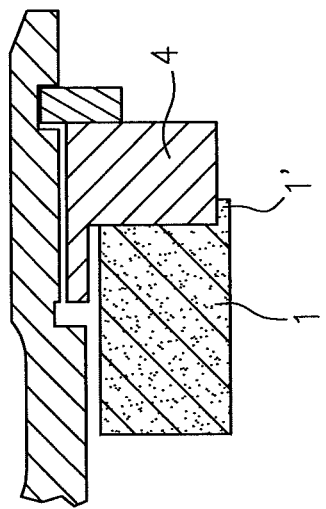
FIG. 1C illustrates a carbon ring in a worn condition with a wear step in accordance with the prior art.
Figure 1B:
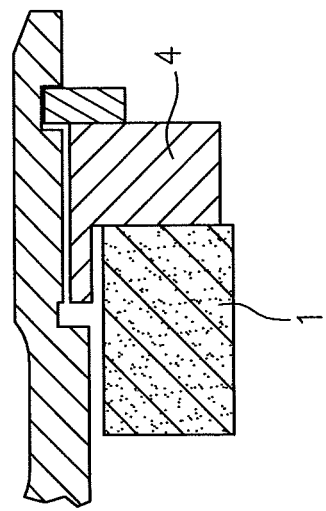
FIG. 1B illustrates a carbon ring in an unworn condition in accordance with the prior art.
Figure 3B:
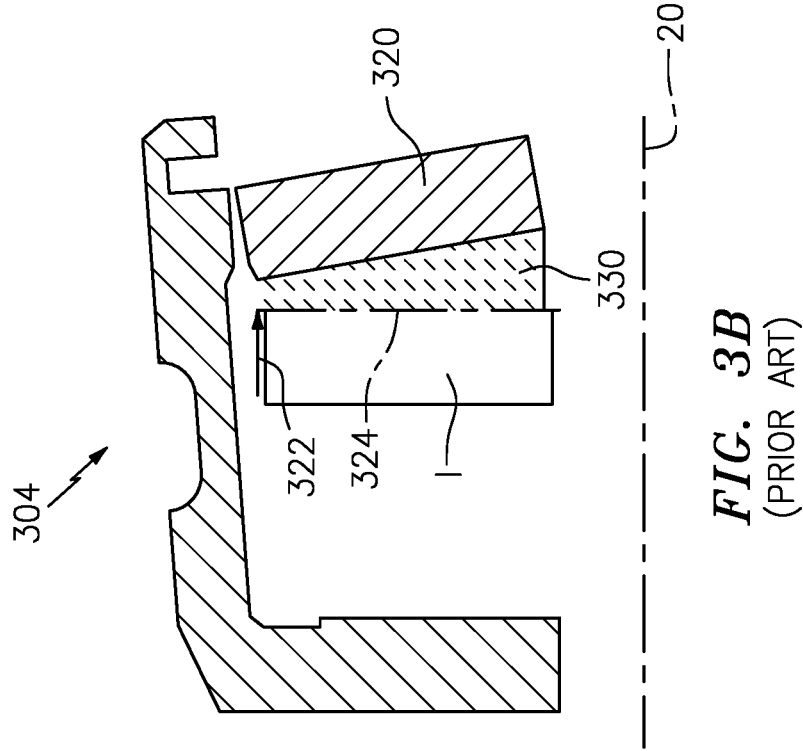
FIG. 3B illustrates the seal housing of FIG. 3A when subjected to operational coning in accordance with the prior art.
Figure 3A:
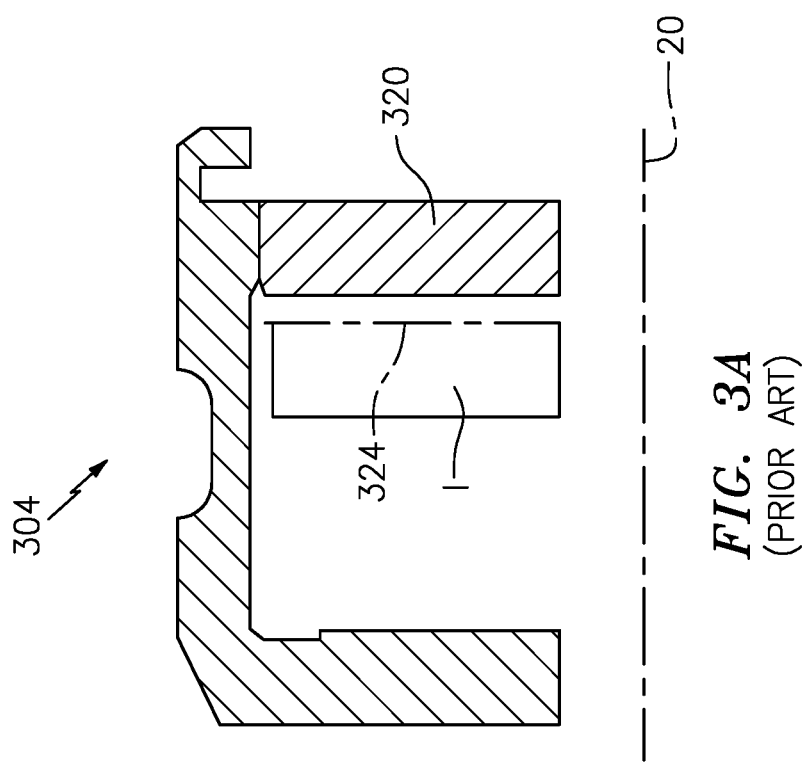
FIG. 3A illustrates a seal housing in accordance with the prior art.

Referring to FIG. 3A, a seal housing 304 in accordance with the prior art is shown. The seal housing 304 may correspond to one or more of the housings 4 of FIGS. 1A-1C. The housing 304 may be manufactured using conventional machining techniques. The seal housing 304 is comprised of one or more sections, a particular section is identified in FIG. 3A as a section 320. The section 320 may be aligned with (e.g., parallel to) an axis 324 which may substantially coincide with a surface of a carbon ring (e.g., carbon ring 1) prior to use/operation.

FIG. 3B illustrates coning experienced by the seal housing 304 with respect to the section 320 when the housing 304 is subjected to use. In particular, when the housing 304 is subjected to an airflow, which may initially be substantially oriented in a direction of the arrow 322 and then substantially oriented in a direction coinciding with the axis 324, the section 320 may be subjected to a coning (which may also be referred to as a rotation, translation, inclination, or sloping) relative to the axis 324. This coning may result in a generation of a step in a carbon ring, such as the step 1' in the carbon ring 1 described above in connection with FIG. 1C. This step may also be expressed in terms of the gap/space created between the surface of the carbon ring 1/the axis 324 and the section 320 as having created a divergent wedge 330 as shown in FIG. 3B.

In contrast to FIG. 3A, FIG. 4A illustrates a seal housing 404 defining a cavity 406 configured to receive a seal (e.g. carbon ring 1). The cavity 406 includes a closed end 408 and an open end 410. The seal housing 404 may be comprised of one or more sections; a-particular sections identified in FIG. 4A are a first section 412 and a tapered second section 420. The first section 412 includes a first radial surface 416 while the second section 420 includes a tapered second radial surface 430. The first radial surface 416 and the second radial surface 430 define opposite sides of the cavity 406. The second section 420 is rotatable relative to the first section 412 between a first position (shown in FIG. 4A) and a second position (shown in FIG. 4B). In the first position, the open end 410 of the cavity 406 has a first axial width 414. In contrast to the section 320 of FIG. 3A (wherein the section 320 is manufactured/fabricated to be substantially parallel to the axis 324), the second section 420 is not manufactured to be parallel to the axis 324. Instead, a pre-taper is provided in the second section 420 relative to the axis 324. For example, the second radial surface 430 of the second section 420 is subjected to a pre-taper. In an illustrative example, the pre-tapering of the second section 420/second radial surface 430 may be equal to approximately 0.004 inches per inch (0.1016 millimeters per millimeter), which is to say that the pre-tapering of the second radial surface 430 that is proximate to the axis 324 may provide for an extension in the x-direction (with respect to the x-y axes that have been superimposed in FIG. 4A for reference purposes) by 0.004 inches (0.1016 mm) for every inch (mm) of the second section 420/second radial surface 430 as measured in the direction of the y-axis. In some embodiments, the pre-tapering of the second section 420/second radial surface 430 may be within a range of a first value that is greater than zero and a second value that is approximately equal to 0.050 inches per inch (1.27 millimeters per millimeter).

More generally, the amount of the pre-taper on the second section 420/second radial surface 430 may be selected to be approximately equal (in terms of magnitude) and opposite (in terms of direction) to the coning that the second section 420/second radial surface 430 is expected to experience when the seal housing 404 is placed into operational use. Such an operational coning may be predetermined/specified based on one or more requirements (e.g., materials used for various components, sizes or dimensions of the various components, operational temperatures, operational pressures, operational forces, an interference fit magnitude, variations of parameters within a housing structure, etc.) and may be selected based on analysis or experience.

FIG. 4B illustrates the seal housing 404 when placed into such operational use. In this second position, the open end 410 of the cavity 406 has a second axial width 418 that is greater than the first axial width 414 in the first position. As shown in FIG. 4B, the second radial surface 430 (that abuts/contacts the flow 322) is substantially parallel with the axis 324. By reducing the operational coning of the second section 420 in FIG. 4B, seal force balance may be more favorable due to a higher pressure profile factor (e.g., pressure distribution and/or distribution of pressure across one or more surfaces) and may result in lower axial force, lower axial contact pressure, and lower resulting carbon element/ring wear. Additionally, an increase in terms of surface area of contact may be obtained that may reduce contact pressure. The step 1' of FIG. 1C may be avoided using the seal housing 404 featuring the tapered second section 420.

Aspects of the disclosure may be used to account for coning in one or more directions. Aspects of the disclosure may be applied in connection with divergent coning or convergent coning.

Aspects of the disclosure may be applied in connection with various types of seals, such as for example various types of radial seals. For example, aspects of the disclosure may be applied in connection with various radial sealing applications, e.g., a single segmented ring, a non-segmented solid ring, or non-segmented single piece solid split ring.

Technical effects and benefits of this disclosure include cost and quality metric improvements, seal reliability metric improvements, and an improvement in terms of a reduction in aircraft engine maintenance or service cycle requirements. Such effects/benefits may be applied in an industrial context and may be used to extend/enhance a seal or seal housing lifetime. Aspects of the disclosure may be used to enhance or maintain contact area between a carbon ring and a seal housing while reducing/minimizing a differential pressure (and hence, a force) experienced by the carbon ring or seal housing.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. An apparatus for an engine, comprising:
   a seal;
   a seal runner; and
   a housing including:
      a first section; and
      a second section coupled to the first section,
   wherein a first radial surface of the second section is directly adjacent to a second radial surface of the seal, and
   wherein the first radial surface is tapered with respect to the second radial surface of the seal and includes a first end that is proximate the seal runner and a second end that is radially distant from the first end with respect to the seal runner,
   wherein the second section has a first axial width at the first end which is larger than a second axial width of the second section at the second end, and
   wherein the first end is axially forward of the second end with respect to an axial centerline of the engine.

2. The apparatus of claim 1, wherein a direction of the taper is opposite to a direction of a coning of the second section.

3. The apparatus of claim 1, wherein the taper is equal to 0.004 inches per inch.

4. The apparatus of claim 1, wherein the apparatus is configured to house two rings.

5. The apparatus of claim 1, wherein the first radial surface is tapered from the first end to the second end.

6. A system configured for providing a seal for an aircraft engine, comprising:
   a seal runner,
   at least two rings arranged adjacent to one another; and
   a housing of the engine comprising a plurality of sections configured to house the at least two rings,
   wherein a first radial surface of one of the sections is directly adjacent to a second radial surface of one of the at least two rings,
   wherein the first radial surface is tapered with respect to the second radial surface of one of the at least two rings and includes a first end that is proximate the seal runner and a second end that is radially distant from the first end with respect to the seal runner,
   wherein the second section has a first axial width at the first end which is larger than a second axial width of the second section at the second end, and
   wherein the first end is axially forward of the second end.

7. The system of claim 6, wherein a direction of the taper is opposite to a direction of a coning of the one of the sections.

8. The system of claim 6, wherein the at least two rings are carbon rings.

9. The system of claim 6, wherein the taper is between zero and 0.050 inches per inch.

10. The system of claim 6, wherein the first radial surface is tapered from the first end to the second end.

11. A seal assembly for an engine, comprising:
    a seal; and
    a seal housing having a cavity configured to receive the seal, the cavity having a closed end and an open end, the seal housing including a first housing section and a second housing section in contact with one another, the first housing section having a first radial surface and the second housing section having a tapered second radial surface, wherein the first radial surface and the tapered second radial surface define opposite sides of the cavity;
    wherein the second housing section is rotatable relative to the first housing section between a first position and a second position;
    wherein in the first position the tapered second radial surface converges toward the first radial surface in the direction from the closed end to the open end of the cavity and the open end of the cavity has a first axial width;
    wherein in the second position the open end of the cavity has a second axial width that is greater than the first axial width; and
    wherein in the second position the tapered second radial surface is non-convergent with the first radial surface in the direction from the closed end to the open end of the cavity.

12. The seal assembly of claim 11, wherein the second housing section is configured to rotate from the first position to the second position in response to an airflow in contact with the tapered second radial surface.

13. The seal assembly of claim 11, wherein the tapered second radial surface is tapered from an outer radial end of the second housing section, in contact with the first housing section, and an inner radial end of the second housing section opposite the outer radial end.

* * * * *